Patented Feb. 20, 1923.

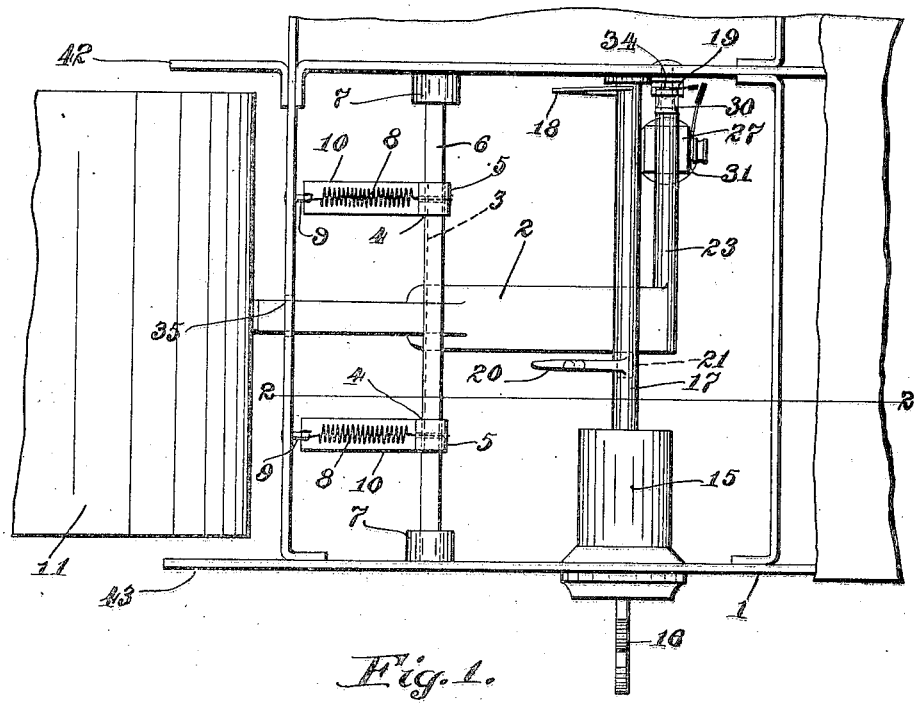

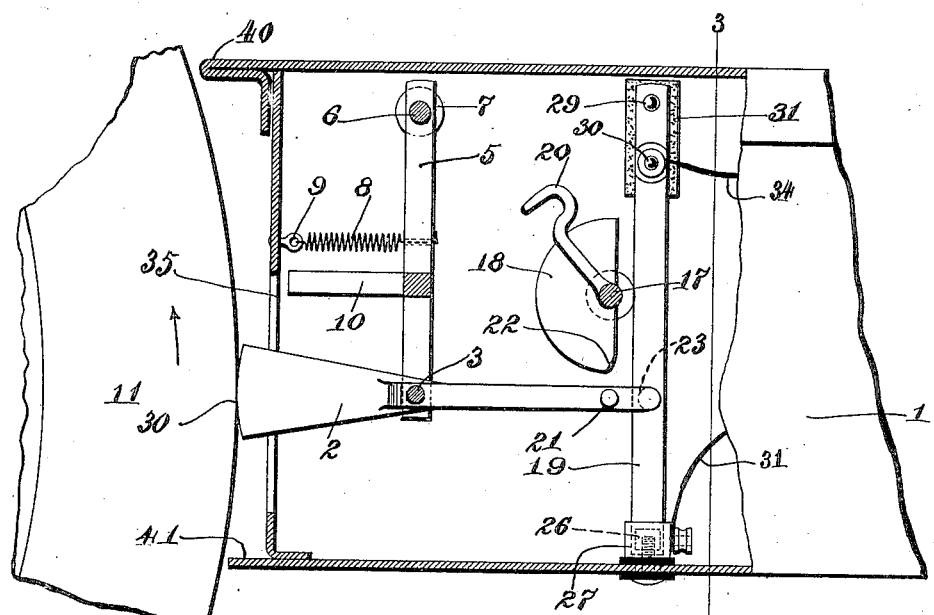
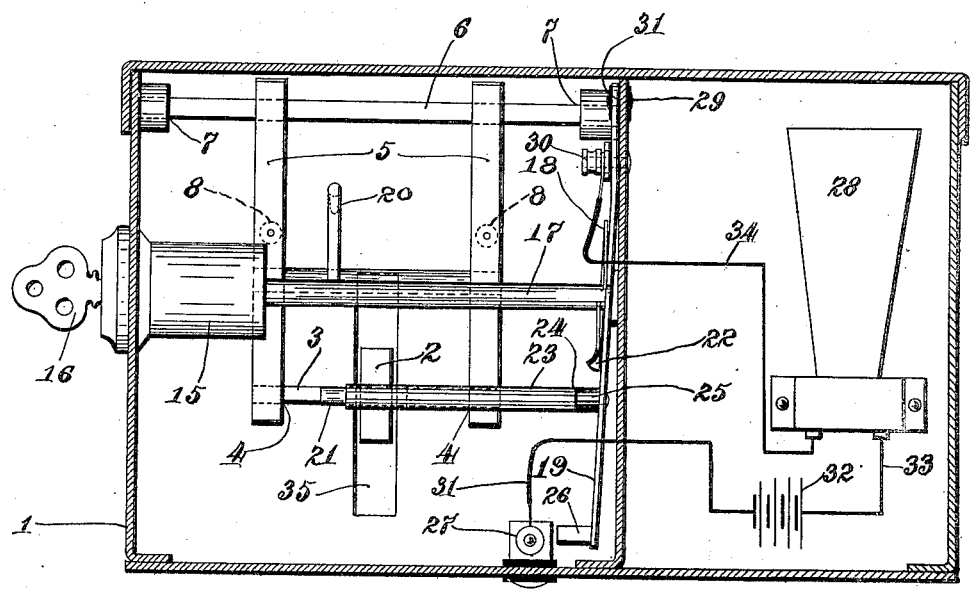

1,446,242

UNITED STATES PATENT OFFICE.

JACOB M. BIXLER AND ANNA B. GROUT, OF BALTIMORE, MARYLAND.

THEFT-PREVENTING DEVICE FOR MOTOR VEHICLES.

Application filed July 3, 1920. Serial No. 393,955.

*To all whom it may concern:*

Be it known that we, JACOB M. BIXLER and ANNA B. GROUT, citizens of the United States of America, and residents of the city of Baltimore, State of Maryland, have invented certain new and useful Improvements in Theft-Preventing Devices for Motor Vehicles, of which the following is a specification.

Our invention relates to improvements in a theft preventing device for motor vehicles and the object of which is to provide a machine that will overcome the difficulties usually met with in a number of alarms of this character, that is to provide a machine of substantial and simple construction; that is connected directly to the motor, the smallest movement of which will cause the alarm to operate; that can be placed in operative condition by means of a key when the car is left standing on the public highway, or released and placed in an inoperative or neutral position by means of the key when the operator wishes to use the car. The particular design of the structure as shown, has its advantages in that it is cheap, simple and durable and can be maintained with a very small amount of expense. Attention is called to the special means of contact between the motor and signaling device—this as shown is dependant upon frictional engagement under tension with the fly wheel of the motor and is very sensitive to the rotary movement of the fly wheel or motor in either direction, this movement of the fly wheel causing the device to trip, sounding the alarm immediately and continuously until the key is inserted in the lock and the alarm reset.

In the accompanying drawing we have illustrated a signaling device, used for the prevention of the theft of automobiles, embodying the features of our invention in the preferred form.

In the drawings:—

Figure 1 is a plan view the casing being partly broken away.

Figure 2 is a sectional view of the apparatus on the line 2—2 of Figure 1.

Figure 3 is a section taken on the line 3—3, Figure 2.

Referring to the drawings by numerals, we have illustrated a signaling device for use with automobiles for prevention of theft, which consists of a casing or housing 1, a pivoted or swinging motor engaging member 2 carried by a rod 3 supported at 4 by the two hangers 5, the hangers in turn being hung from the shaft 6 carried in the casing at 7. The hangers 5 are connected to springs 8 as shown; these are held in place by eye bolts or rivets 9 in the casing; the hangers 5 also carry abutting or spacing members 10 for the purpose of limiting the movement of the swinging arm 2 particularly when it is in operative position and engaged with the fly wheel 11. As the springs 8 are constantly subjecting the swinging arm 2 to a pressure against the fly wheel 11, it is important that when the arm 2 is tripped it does not, by having too much movement, become jammed between the casing 1 and the fly wheel 11 due to the pull of the springs 8.

For the purpose of an effective means to prevent unauthorized persons from operating the theft preventing device, we use a lock 15 and key 16 as shown, the lock is connected to the shaft 17 which carries and has fixed thereto, a segmental screw shaped cam 18, which engages the spring plate 19, when the shaft 17 is turned by the key 16, for the purpose of holding the spring plate 19 in an inoperative position, when it is desired to use the motor without causing the signal to operate; simultaneously and in conjunction with this turning of the rod or shaft 17, a hook shaped member 20 carried by this shaft is moved around and engages a pin 21 directly in its path, this pin is carried by the swinging arm 2 and is for the purpose of engaging the hook 20 to enable the hook to withdraw the swinging member 2 from operative position or engagement with the fly wheel 11. The segmental cam 18 is flanged outwardly at 22 to insure its passing above or over the spring plate 19 when it is desired to lock the device in inoperative position. The swinging arm 2 also carries at right angles thereto a projecting rod 23, as shown particularly in Figure 1, the end at 24 of which engages the spring 19 at 25 when the device is in operative position for the purpose of withholding the contacting point 26 carried at the lower end of the spring plate 19 from engaging or contacting the binding post 27 and completing the electric circuit causing the electric sounding member or horn 28 to signal. The spring plate 19 is fastened or fixed at its upper end by means of a rivet 29 and the binding post 30, being properly insulated at 31.

The operation of the device is as follows:—before leaving his automobile the driver inserts the key 16 in the lock 15 and turns the same clockwise for a distance of about half a turn, releasing the hook 20 from the pin 21 permitting the swinging member 2 to move up to and be held against the fly wheel 11 under pressure by means of springs 8 as shown in Figure 2; also causing the segmental screw shaped cam 18 to move off of and release the spring plate 19 permitting it to spring outwardly until the post or button 25 engages the end 24 of the rod 23, thus causing the contacting member 26 to be held in a withdrawn position from the binding post 27. To place the signaling device back to its former inoperative or neutral position the driver upon returning to his car and before moving the motor inserts the key 16 in its lock and turns it counter clockwise, for about half a turn causing the hook 20 to engage the pin 21, withdrawing the swinging arm 2 from the fly wheel 11, also moving the cam 18 over the spring plate 19 causing same to be held in a withdrawn position; it should be noted that the cam engages the spring plate 19 previous to the removal of the rod 23 from the spring at 25 by the action of the hook 20 on the pin 21. This is so timed to prevent the plate 19 moving from beyond the path of the cam 18.

Should the car be left on a public highway and the signaling device set in operative position it will immediately give the signal or alarm should the motor be moved for about the distance of one quarter of an inch, presumably by an unauthorized person, upon the movement of the fly wheel 11 the swinging arm 2 is caused to partly rotate about the shaft 3 by its frictional engagement at 30 with the moving fly wheel throwing or disengaging the rod 23 at 24 from the spring at 25. The spring plate 19 being released carries the contacting member 26 over to and in engagement with the binding post 27 thereby completing the circuit through the wire 31 to the battery 32 thence through the wire 33 passing through the sounding member 28, which as shown is an electric horn but which may be a bell or any character of sounding or alarm device desired, thence through the wire 34 to the binding post 30 and passing down through the spring plate 19 completing the circuit.

The whole of the device as shown is completely enclosed within the casing or box 1, with the exception of the end of the swinging arm 2 which engages the fly wheel. The apparatus can be so arranged as to be completely concealed from view and from the possibility of tampering. The lock can be so arranged as to be accessible for locking or unlocking from the instrument board of the automobile. This complete enclosure and sealing of the parts in the casing or box 1 prevents tampering in case of attempted theft. The exposed end of the swinging arm 2 that engages the fly wheel, passes thru a slot in the casing at 35. It is obvious that any tampering with this member such as moving it up or down a very small fraction of an inch with an instrument or wedge in an attempt to render the device inoperative for the purposes of theft, will immediately throw the rod 23 off the spring at 25 causing the sounding member 28 to operate and give the necessary warning.

It will be noted that for the purpose of prevention of any successful attempt to render the device inoperative by inserting an instrument thru the slot 35 in the casing, we have extended upper and lower flanges 40 and 41 respectively, close to the outside periphery of the flywheel as shown, also side flanges 42 and 43 to also assist in preventing access to the mechanism thru the slot 35.

Having thus described a signaling device, particularly for the purpose of the prevention of theft of motor vehicles and the like, embodying our invention specifically in order that it may be made and used by those skilled in the art, we would have it understood that we do not intend to limit our invention to the details thus described.

What we claim and desire to secure by Letters Patent is:

In a theft alarm signal for motor vehicles a pivoted member for engaging a rotating part of a vehicle, means for yieldingly holding said member in engagement with the rotating part, a signal circuit including a signal, a battery and a switch comprising a stationary contact and a spring contact normally in engagement with said stationary contact, means on said pivoted member for holding said spring contact out of engagement with said stationary contact when said rotating part is stationary and permitting it to move to circuit closing position when said rotating part moves to swing said pivoted member about its pivot, locking means for moving and maintaining said pivoted member out of engagement with said rotating part and for moving and holding said spring contact out of circuit closing position and a casing enclosing said apparatus having a slot therein to permit the pivoted member to project out of the casing to engage the rotating part.

Signed by us at Baltimore, Maryland, this 30th day of June 1920.

JACOB M. BIXLER.
ANNA B. GROUT.

Witnesses:
PORTER H. FLAUTT,
MARY R. HOPKINS.